(12) United States Patent
Gu et al.

(10) Patent No.: US 8,391,197 B2
(45) Date of Patent: Mar. 5, 2013

(54) METHOD, SYSTEM, AND TERMINAL FOR SENDING AND RECEIVING MULTICAST BROADCAST SERVICE

(75) Inventors: Liang Gu, Shenzhen (CN); Wei Zhang, Shenzhen (CN); Yong Xie, Shenzhen (CN); Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1023 days.

(21) Appl. No.: 12/405,860

(22) Filed: Mar. 17, 2009

(65) Prior Publication Data

US 2009/0175213 A1 Jul. 9, 2009

Related U.S. Application Data

(63) Continuation of application No. PCT/CN2007/070716, filed on Sep. 18, 2007.

(30) Foreign Application Priority Data

Sep. 18, 2006 (CN) .......................... 2006 1 0159410

(51) Int. Cl.
*H04H 20/71* (2008.01)
*H04L 12/56* (2006.01)
*H04J 3/26* (2006.01)

(52) U.S. Cl. .......................... 370/312; 370/390; 370/432

(58) Field of Classification Search .................. None
See application file for complete search history.

(56) References Cited

U.S. PATENT DOCUMENTS

| 2006/0176864 A1 | 8/2006 | Blasco Claret et al. |
| 2006/0239265 A1* | 10/2006 | Son et al. ....................... 370/390 |
| 2007/0091882 A1 | 4/2007 | Moon et al. |
| 2008/0026715 A1* | 1/2008 | Gao ............................. 455/187.1 |
| 2009/0252120 A1* | 10/2009 | Kim et al. ....................... 370/331 |

FOREIGN PATENT DOCUMENTS

| CN | 1509020 | 6/2004 |
| CN | 1665318 | 9/2005 |
| WO | WO-2005020470 | 3/2005 |

OTHER PUBLICATIONS

Written Opinion of the International Searching Authority, PCT Application No. PCT/CN2007/07070716, Applicant: Huawei Technologies Co., Ltd., et al., Mailing date: Dec. 20, 2007, 4 pages.

* cited by examiner

*Primary Examiner* — Ayaz Sheikh
*Assistant Examiner* — Sori Aga
(74) *Attorney, Agent, or Firm* — Slater & Matsil, L.L.P.

(57) ABSTRACT

A method, a system, and a terminal for sending and receiving a multicast broadcast service (MBS) are provided in the communication field. Based on a preset correspondence between MBS content IDs and LCIDs, a network side sends MBS data with an LCID corresponding to the MBS content ID in an air interface link identified by an MCID. A terminal generates a corresponding LCID from the MBS content ID of the MBS based on the same correspondence as that of the network side, and receives data via a logical channel identified by the LCID in the air interface link identified by the MCID of the required MBS. A method for assigning an MBS information ID is also provided. The uniqueness of the MBS content ID can be guaranteed within an operator, an access service network (ASN), or an MBS zone.

19 Claims, 3 Drawing Sheets

METHOD, SYSTEM, AND TERMINAL FOR SENDING AND RECEIVING MULTICAST BROADCAST SERVICE

CROSS-REFERENCE TO RELATED APPLICATIONS

The present application is a continuation of International Application No PCT/CN2007/070716, filed on Sep. 18, 2007, which claims priority to Chinese Patent Application No. 200610159410.6, filed on Sep. 18, 2006, all of which are hereby incorporated by reference in their entireties.

BACKGROUND OF THE INVENTION

1. Field of the Technology

The present invention relates to the communication field, and more particularly to a multicast broadcast technology in a worldwide interoperability for microwave access (WiMAX) system.

2. Background of the Invention

Worldwide interoperability for microwave access (WiMAX), as a wireless metropolitan area network (MAN) technology, is applicable for wireless broadband access. FIG. 1 shows an end-to-end reference model of a WiMAX system. Referring to FIG. 1, the WiMAX system mainly includes a mobile station (MS)/subscriber station (SS), an access service network (ASN), and a connectivity service network (CSN).

The ASN is defined as a set of network functions for providing wireless access services to WiMAX subscriber terminals, and includes a base station (BS) and a network element, ASN gateway (ASN-GW). One ASN may be shared by a plurality of CSNs.

The main functions of the ASN include functions of the BS and functions of the ASN-GW. The functions of the BS include: providing an L2 connection between the BS and an SS/MS, radio resource management, measurement and power control, and air interface data compression and encryption. The functions of the ASN-GW include: providing a proxy function for authentication, authorization, and accounting functions of the SS/MS; supporting network discovery and selection of a network service provider (NSP); and providing a relay function (e.g. IP address assignment) of L3 information for the SS.

The CSN is defined to provide IP connectivity services to WiMAX subscriber terminals. The CSN mainly provides the following functions: IP address assignment for the SS/MS; Internet access; authentication, authorization, and accounting (AAA) proxy or server; subscriber-based authorization control; providing a tunnel from the ASN to the CSN; accounting of WiMAX subscribers and settlement between operators; providing a tunnel between the CSNs during roaming; inter-ASN handover; and various WiMAX services (e.g. location-based service, multimedia broadcast/multicast service (MBMS), and IP multimedia subsystem (IMS) service).

The MS/SS is a user equipment, with which a subscriber accesses a WiMAX network.

Generally, the communication refers to a communication carried out between one node and another node. However, with the increasing of the user requirements and introduction of multimedia, a new transmission mode is required, for example, including point-to-multipoint communication and even including multipoint-to-multipoint communication. In order to support such modes and utilize the communication resources effectively, i.e., multiplexing some critical communication resources such as air interface bandwidth, a connection ID (CID), and a transmission tunnel of an access network, a multicast broadcast service (MBS) has been proposed in the conventional art.

In the traditional concept of communication, multicast and broadcast are technologies for transferring a data from one data source to a plurality of targets. The MBS provides a specification for sending a data from one data source to a plurality of subscribers in a mobile network, thus achieving sharing of network resources and increasing the utilization of network resources, especially air interface resources.

It should be noted that, the MBS can not only multicast and broadcast low-rate text message services, but also multicast and broadcast high-speed multimedia services, such as video on demand, television broadcasting, video conference, online education, and interactive game and the like.

The protocol in the prior art supports air interface signaling and data transmission of the MBS. Transmission modes of the MBS may be classified into a single-BS mode and a multi-BS mode. The concept of MBS zone is defined under the multi-BS mode. One so-called MBS zone refers to one set of BSs that shall satisfy a condition: the multicast connection identifier (MCID) and the security association (SA) adopted when sending an MBS data must be consistent with each other. In the prior art, there are no detailed descriptions about the single-BS mode, but corresponding descriptions about how a BS sends an MBS data, how an MS receives the MBS data, and how the BS notifies the MS that the MBS data interested by the MS has been sent under the multi-BS mode can be found.

Descriptions about the air interface in the existing system are mainly provided as follows.

Firstly, a downlink map (DL-MAP) message broadcasted on a broadcast CID includes zero to one or more multicast broadcast service map information elements (MBS-MAP-IEs). Each entry on each MBS-MAP-IE is identified by an MBS zone ID.

Secondly, one MBS-MAP-IE identifies physical resources for broadcasting a multicast broadcast service map (MBS-MAP) message on the air interface, which directly indicates physical resources of the MBS under the single-BS mode.

Thirdly, one MBS-MAP message may include zero to one or more multicast broadcast service data information elements (MBS-DATA-IEs) or extended MBS-DATA-IEs. Physical parameters of the MBS-DATA-IEs may be consistent with each other or not depending upon a network side. However, one MBS-DATA-IE merely has one physical parameter set.

Fourthly, one MBS-DATA-IE includes one or more MCIDs. One MBS-DATA-IE is required to include one or more MCIDs in order to reduce a length of the MBS-MAP message, in which all MCIDs corresponding to the MBS data with the same downlink interval usage code (DIUC) are indicated in one MBS-DATA-IE. As for data transmission, medium access control-protocol data units (MAC-PDUs) with the same DIUC are transmitted in the same physical resources. Although being mixed up within the physical resources, different MBS data may be separated from one another in an upper portion of a MAC layer according to MCIDs in MAC-PDU headers. Not all MCIDs correspond to the same MBS, but each MCID corresponds to one MBS.

Fifthly, in an extended MBS-DATA-IE, one MCID further includes one or more logical channel IDs (LCIDs). The LCIDs are used in the air interface to inform the MS whether there are contents interested by the MS or not in the currently indicated MBS data.

In addition, zero to one or more MBS zone IDs may be carried in a dynamic service deletion (DSD) process. MBS content IDs, MCIDs, and LCIDs are one-to-one correspondent to one another. The MBS content IDs are used to identify upper layer data flows borne by a service flow (SF) in a WiMAX access network.

The DL-MAP message indicates physical resources for sending a next MBS-MAP message, but does not distinguish MCIDs and LCIDs carried in the MBS-MAP message. The MBS-DATA-IE also has an indication for physical resources for sending a next MBS-MAP message. Different from the indication in the DL-MAP, the MBS-MAP message herein is a special MBS-MAP message that must include one MBS-DATA-IE having the same MCID and LCID as the current MBS-DATA-IE. In this manner, the MS does not need to receive DL-MAP messages one by one, and can get to know a time point for sending the next interested MBS-MAP message simply based on the current MBS-MAP-IE.

In addition, the MBS-DATA-IE also has a change indication. If no change is indicated, the MBS data is directly received; otherwise, a new MBS-DATA-IE needs to be parsed, so as to update relevant MBS information of the MS.

Two MBS service modes are defined in existing air interface standards, that is, a single-BS service mode and a multi-BS service mode. In the multi-BS service mode, a connection ID of an air interface link layer needs to be unique within the whole MBS zone. In the single-BS service mode, a connection ID of an air interface link layer only needs to be unique within a BS. The connection ID of an air interface link layer may be either a CID or an MCID.

One air interface link layer connection can bear one or more upper layer data flows, and it is defined in the standards to adopt MBS content IDs to distinguish different upper layer data flows borne by an air interface link layer connection. When one air interface link layer connection bears a plurality of contents, LCIDs are used in the link layer for identification, so as to indicate the contents borne in the link layer packets. However, in the existing standards, LCIDs assigned by a network side entity cannot be notified to the MS through a defined link layer management message in advance. Moreover, no specific methods for assigning MCIDs, MBS content IDs, and LCIDs as important IDs in the MBS system are provided in the prior art.

SUMMARY OF THE INVENTION

Accordingly, various embodiments of the present invention provide a method, system, and terminal for sending and receiving a multicast broadcast service (MBS), which enable a mobile station (MS) in a WiMAX system to obtain an MBS data corresponding to an MBS content ID from an air interface, thereby implementing an MBS.

One embodiment of the present invention provides a method for sending an MBS, which includes: assigning a transmission ID to an MBS; and sending an MBS data in a link corresponding to the transmission ID.

Alternatively, the transmission ID includes a multicast connection ID (MCID) for identifying an air interface link.

Alternatively, the transmission ID includes an MCID for identifying an air interface link and an MBS content ID for identifying a different MBS data flow.

Alternatively, the transmission ID includes an MCID for identifying an air interface link, an MBS content ID for identifying a different MBS data flow, and a logical channel ID (LCID) for identifying a logical channel in the air interface link. One MBS content ID uniquely corresponds to one LCID and one MCID in an MBS zone.

The sending the MBS data in the link corresponding to the transmission ID further includes sending the MBS data via a logical channel identified by an LCID corresponding to an MBS content ID in an air interface link identified by an MCID based on a preset correspondence between MBS content IDs and LCIDs.

Another embodiment of the present invention further provides a method for receiving an MBS, which includes: obtaining, by a terminal, a transmission ID of an MBS; and receiving an MBS data in a link indicated by the transmission ID.

Alternatively, the transmission ID includes an MCID for identifying an air interface link.

Alternatively, the transmission ID includes an MCID for identifying an air interface link and an MBS content ID for identifying a different MBS data flow.

Alternatively, the transmission ID includes an MCID for identifying an air interface link, an MBS content ID for identifying a different MBS data flow, and an LCID for identifying a logical channel in the air interface link. One MBS content ID uniquely corresponds to one LCID and one MCID in an MBS zone.

The obtaining, by the terminal, the transmission ID of the MBS further includes: obtaining, by the terminal, an MCID of the MBS and obtaining an MBS content ID of the required MBS; and obtaining a corresponding LCID from the MBS content ID based on the same correspondence as that of a network side.

The receiving the MBS data in the link indicated by the transmission ID further includes: receiving a data via a logical channel identified by the LCID in an air interface link identified by the MCID.

In an embodiment, the present invention further provides a system for sending an MBS, which includes: an entity adapted to assign a transmission ID to an MBS, and a module adapted to send an MBS data in a link corresponding to the transmission ID.

Another embodiment of the present invention further provides a terminal equipment, which includes a module adapted to obtain an MCID of an MBS, and a module adapted to receive a required MBS data in an air interface link identified by the MCID of the required MBS.

In the technical solutions of the present invention, based on a preset correspondence between MBS content IDs and LCIDs, a network side sends an MBS data with an LCID corresponding to an MBS content ID in an air interface link identified by an MCID. A terminal generates a corresponding LCID from the MBS content ID of the MBS based on the same correspondence as that of the network side, and receives a data via a logical channel identified by the LCID in the air interface link identified by the MCID of the required MBS. As such, a WiMAX terminal can successfully obtain an MBS data corresponding to an MBS content ID from an air interface.

BRIEF DESCRIPTION OF THE DRAWINGS

The present invention becomes more fully understood from the detailed description given herein below for illustration only and by referring to the accompanying drawings among which.

DETAILED DESCRIPTION OF THE EMBODIMENTS

The present invention is described in further detail below by reference to the accompanying drawings attached only by way of example.

It should be noted that, in the following embodiments, each method for transmitting an MBS not only includes a method for sending the MBS, but also includes a method for receiving the MBS, and each system for transmitting an MBS not only includes a system for sending the MBS at a network side, but also includes a terminal for receiving the MBS.

Different MBS data flows sent by an MBS server mentioned in the following embodiments include IP data flows, IP multicast groups, and media streams.

Figure 1:
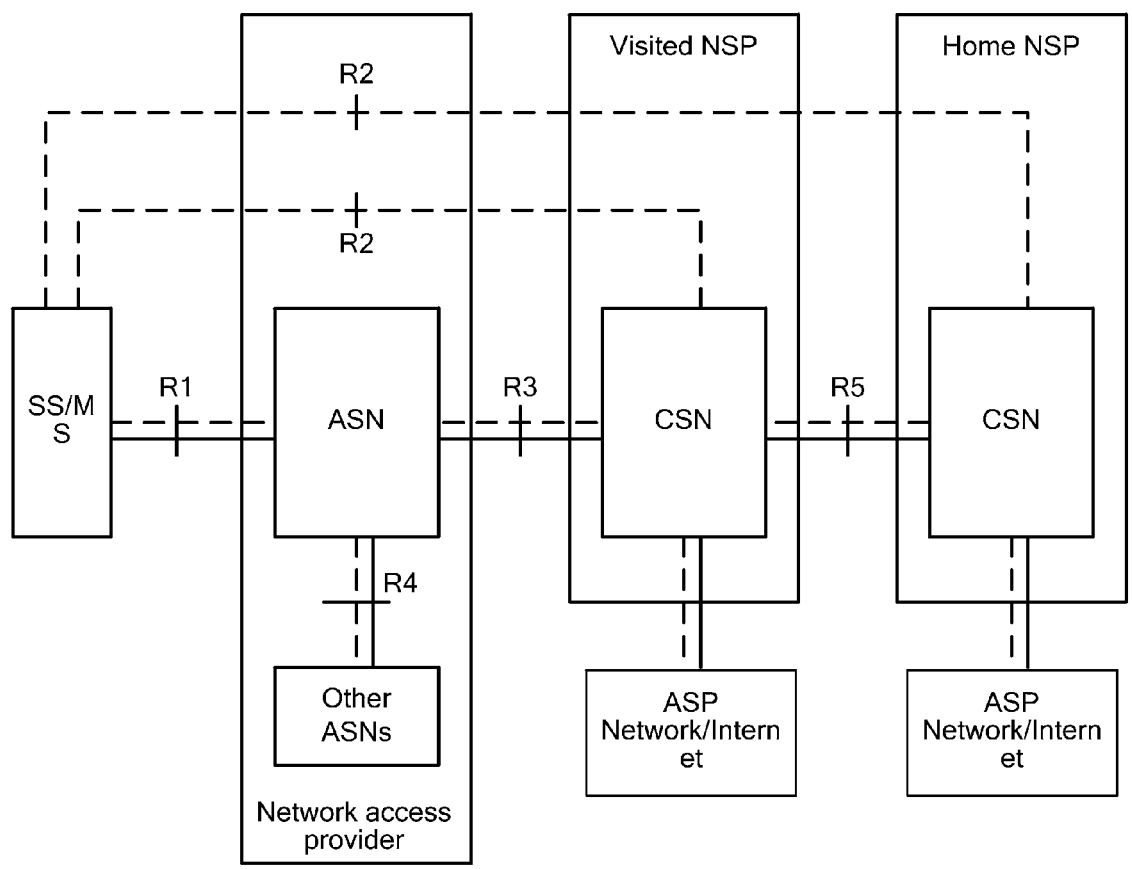
FIG. 1 is a schematic structural view of a WiMAX network in the prior art.
Figure 2:
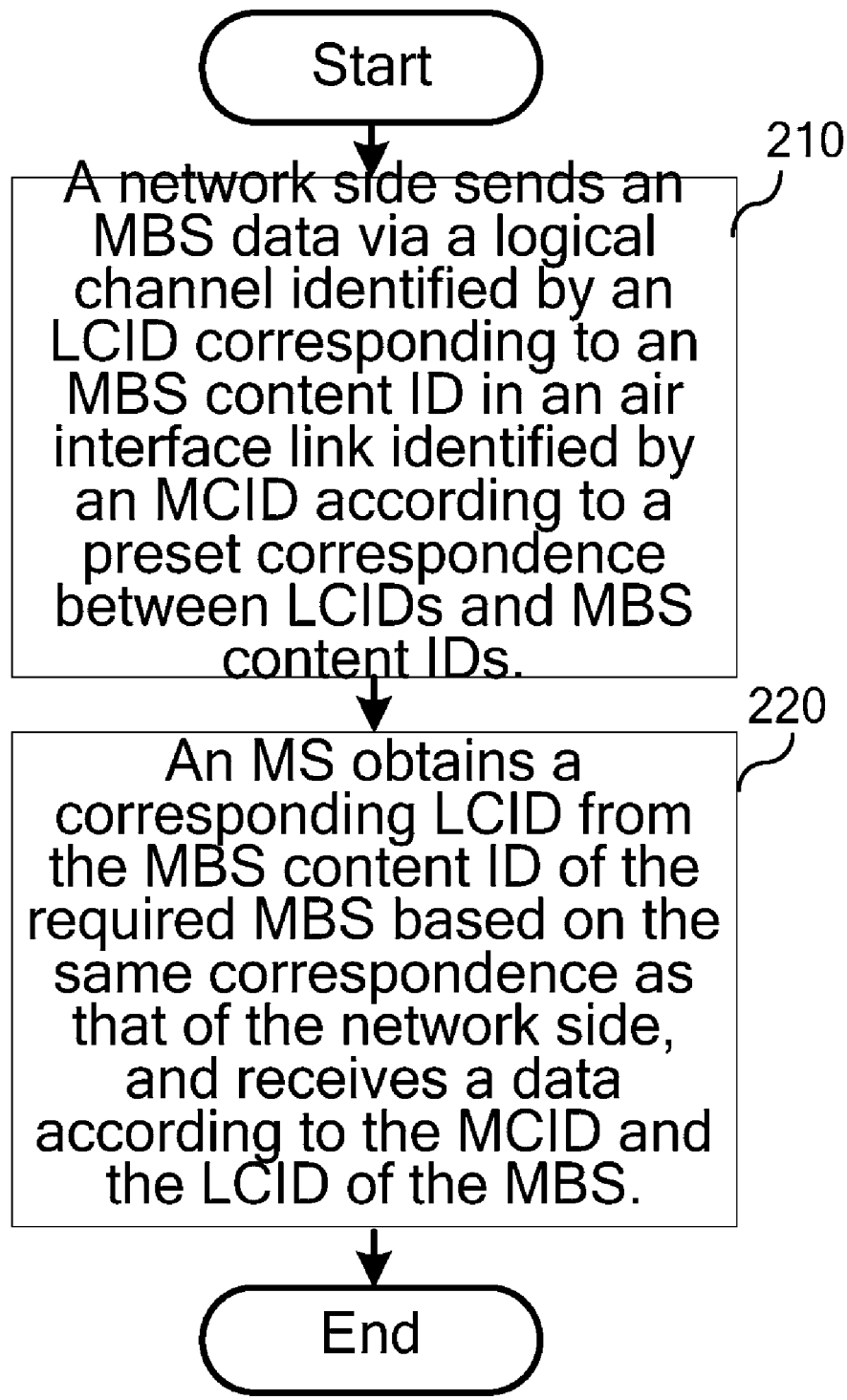
FIG. 2 is a flow chart of a method for transmitting an MBS according to a first embodiment of the present invention.

In a first embodiment of the present invention, a method for transmitting an MBS is provided. A flow of the method is shown in FIG. 2

In Step 210, a network side sends an MBS data via a logical channel identified by an LCID corresponding to an MBS content ID in an air interface link identified by an MCID based on a preset correspondence between LCIDs and MBS content IDs.

In particular, entities at the network side assign MBS content IDs, MCIDs, and LCIDs in advance. The LCIDs correspond to the MBS content IDs in a certain way.

Figure 3:
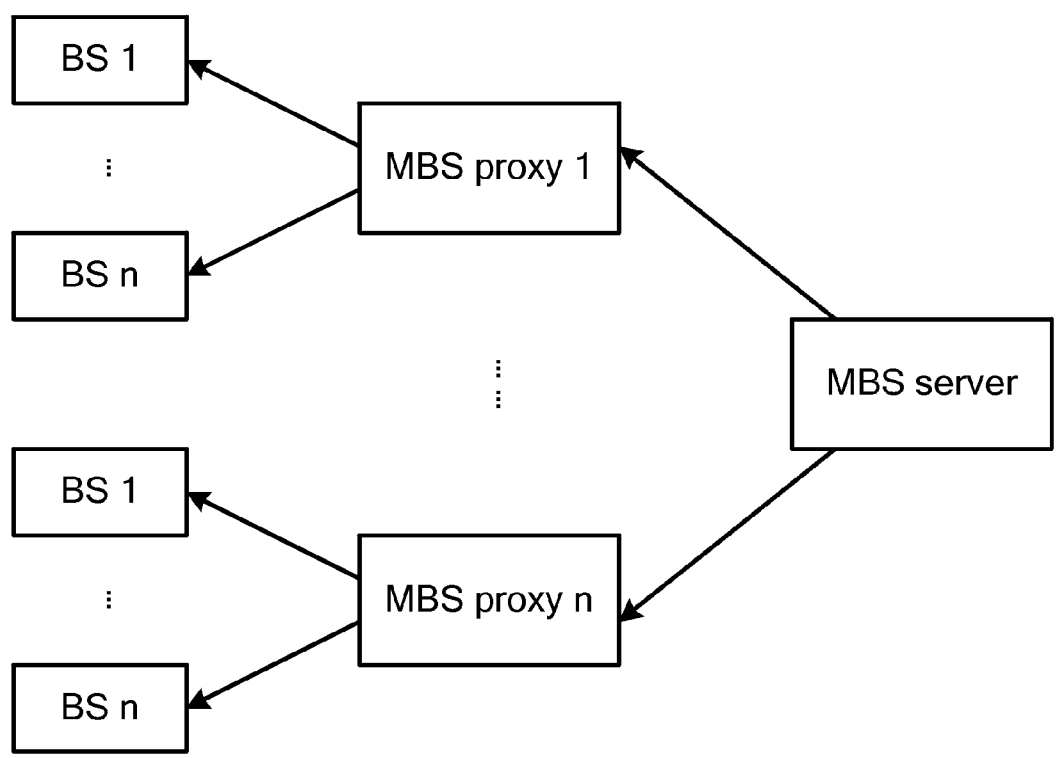
FIG. 3 is a schematic view of a reference model for a signaling plane in the method for transmitting an MBS according to the first embodiment of the present invention.

As shown in FIG. 3, a network side of an MBS system includes an MBS server, an MBS proxy, and a base station (BS). The MBS proxy entity is a functional entity within an ASN or an MBS zone adapted to process an MBS signaling for a mobile station (MS), which may be located in an anchor ASN gateway (ASN-GW) or a serving ASN-GW, and may also independently exist within the MBS zone. In this embodiment, the MBS content IDs are assigned by the MBS server and are adapted to identify different MBS data flows such as IP flows sent by the MBS server. The MCIDs and the LCIDs are assigned by an ASN entity. The IP flows refer to IP data flows that can be uniquely identified by one or more selected from IP source address, IP destination address, type of service/DiffServ code point (TOS/DSCP), protocol type, flow label, transmission control protocol (TCP)/user datagram protocol (UDP) source port number, and TCP/UDP destination port number in IP packets.

The uniqueness of the MBS content IDs assigned by the MBS server can be guaranteed within the following ranges.

(1) The MBS content IDs are unique within the MBS server, and MBS content IDs assigned by different MBS servers may be identical. The identical MBS content IDs assigned by different MBS servers are distinguished by an entity within an ASN and/or an entity within an MBS zone according to IDs or IP addresses of the MBS servers, and the identical MBS content IDs may also be distinguished by using IDs of network service providers if one network service provider only has one MBS server, such that the MBS content IDs are maintained consistent within all ASNs or MBS zones where the service is provided. When an MS moves among different ASNs or MBS zones of the same service, the ASN or MBS zone in a target network gets to know whether an MBS to be received by the MS is provided within the current network or not through handing over an MBS content ID of the MBS and an MBS server ID (or IP address) in a context, so as to further determine whether to accept the handover or not, or it registers to the MBS server and establishes a corresponding bearer channel in advance when the network side can provide the MBS service but currently does not provide the MBS service.

(2) The MBS content IDs are unique within an operator that manages the MBS server. When the MBS server is within a CSN, the operator that manages the MBS server refers to a network service provider. When the MBS server is within an ASN, the operator that manages the MBS server refers to a network access provider. When the operator collectively plans all the MBS content IDs assigned by the MBS servers, it is equivalent to guarantee the uniqueness of the MBS content IDs within each MBS server. Therefore, not only the above operations when the MBS content IDs are unique within the MBS server can be achieved, but also the ASN or MBS zone is enabled to recognize MBS content IDs of the same MBS assigned by MBS servers of different network service providers according to IDs of the network service providers.

(3) The MBS content IDs are unique within an ASN or an MBS zone where the service is provided. The same service may have different MBS content IDs within different ASNs or MBS zones. In this case, the entity within the ASN or the entity within the MBS zone does not need to further distinguish the MBS content IDs of the MBS by using the MBS server IDs or IDs of the network service providers during internal processing. For the MS, if the object of the MBS joined by the MS is a specific IP flow (identified by an MBS content ID), the MS needs to know an MBS content ID used by the original service in a new ASN or MBS zone in advance (for example, from a service announce) when the MS is handed over across ASNs or MBS zones. When the MS designates the joined MBS by using the MBS content ID of the MBS, the MS only needs to further carry an MBS zone ID. If the object of the MBS joined by the MS is a specific IP multicast group, the MS does not need to know the MBS content ID thereof when the MS is handed over across ASNs or MBS zones. Instead, the MS can achieve a re-joining effect simply by using the original multicast address, or successfully joins the IP multicast with an assistance of the network side. The MCIDs may be assigned by an ASN entity according to different modes of the BS. For example, in a multi-BS mode, the MCIDs are collectively assigned by an MBS proxy. In this case, the MCIDs need to be assigned from those MCIDs available to all BSs within the MBS zone, so as to guarantee the uniqueness within the MBS zone. The same service may use different MCIDs when being provided within different MBS zones. Because the existing standards specify that the MCIDs need to be unique within each MBS zone, a unified management function entity, such as an MBS proxy, is required when assigning the MCIDs, so as to satisfy the above requirements.

In a single-BS mode, the MCIDs may be collectively assigned by an MBS proxy or assigned by the BS. If the MCIDs are collectively assigned by the MBS proxy, the MCIDs can be simply assigned from a set of MCIDs that are not used on the BS to guarantee the uniqueness within the BS. When the BS is in a multi-BS mode and a single-BS mode at the same time, if the MCIDs are collectively assigned by the MBS proxy, an MCID assigned to the BS in the single-BS mode will not be assigned to MBS zones in the multi-BS mode again; if the MCIDs are assigned by the BS in the single-BS mode, a conflict between the MCIDs assigned by the BS and that assigned by the MBS proxy to the MBS zones can be avoided by means of dividing value intervals.

The MCIDs assigned by the ASN entity are one-to-one correspondent to service flow IDs (SFIDs), and are assigned to terminals by a dynamic service addition (DSA) process defined by air interface standards.

The LCIDs are assigned by the entity within the ASN or the entity within the MBS zone according to the MBS content IDs, which shall ensure that one LCID uniquely indexes one MBS content ID on one MCID within one MBS zone. The entity within the ASN may be an ASN-GW, an ASN BS, or an MBS proxy. The entity within the MBS zone may also be an ASN-GW, an ASN BS, or an MBS proxy. The ASN-GW is a physical entity available in the existing standards, whereas the MBS proxy is a functional entity newly added within the ASN or MBS zone and may be located in the ASN-GW.

In this embodiment, the MCIDs are collectively assigned by the MBS proxy. When a plurality of contents is borne on one air interface connection, the MBS proxy assigns LCIDs according to value features of the MBS content IDs on the MCID. For example, LCIDs (0, 1, 2 . . . ) are sequentially assigned according to an ascending order of values of the MBS content IDs on the MCID. It should be understood that, the sequential assignment according to the ascending order is merely taken as an example herein, and actual assignment algorithms are not limited here. It is merely intended to emphasize that the LCIDs are assigned after being processed by a certain algorithm according to an MBS content ID list and made to be one-to-one correspondent to the MBS content IDs. At this time, the LCIDs are maintained unique on the same MCID in the same MBS zone, and one MBS content ID uniquely corresponds to one LCID and one MCID in an MBS zone.

It should be noted that, the entity within the ASN or the entity within the MBS zone obtains the MBS content ID of the MBS by one of the following manners.

(1) The MBS content ID of the MBS is obtained through pre-configuration according to an MBS service plan. In particular, the MBS content ID of the required MBS is pre-configured on a relevant entity within the ASN or MBS zone such as the BS and the ASN-GW/MBS proxy through pre-configuration according to the MBS service plan. This manner has a simple deployment and can reduce signaling exchange, which thus is applicable to the case that both the network access provider and the network service provider belong to a unified operating entity.

(2) The MBS content ID of the MBS is received from the MBS server through signaling during a service announcement stage of the MBS. That is to say, during the service announcement stage of the MBS, the MBS server delivers the MBS content ID to a relevant entity within the ASN or MBS zone through signaling. This manner is applicable to the deployment of a wireless metropolitan area network (MAN) or a wide area network (WAN).

Therefore, specific implementations for assigning MBS content IDs, MCIDs, and LCIDs, as well as a correspondence between MBS content IDs and LCIDs are achieved in this embodiment. Therefore, the network side can send an MBS data via a logical channel identified by an LCID corresponding to an MBS content ID in an air interface link identified by an MCID based on a preset correspondence between MBS content IDs and LCIDs.

Then, in Step 220, an MS obtains a corresponding LCID from the MBS content ID of the required MBS based on the same correspondence as that of the network side, and receives a data via a logical channel identified by the LCID in the air interface link identified by the MCID of the required MBS. Because the MS can obtain an LCID corresponding to each MBS content ID according to an agreed algorithm after obtaining the MBS content ID list on the MCID, the network side does not need to inform the MS about the assigned LCIDs. The MS can obtain a corresponding LCID from the respective MBS content ID of the required MBS based on the same correspondence as that of the network side and receive a data via a logical channel identified by the LCID in an air interface link identified by an MCID of the required MBS, so that the MS can successfully obtain the MBS data corresponding to the MBS content ID from the air interface.

It should be noted that, the MS can obtain the MBS content ID of the required MBS by different manners according to the way that the MS joins the MBS.

In particular, if the MS joins the MBS by using a DSA request (DSA-REQ) message defined in the existing standards and the message is required to carry an MBS content ID, the MS needs to obtain the MBS content ID through a high-level message exchange before initiating the DSA-REQ. For example, the MS obtains the MBS content ID from a service announce initiated by the MBS server or from a DSA response (DSA-RSP) message returned by the network side. If the MS is not required to provide the MBS content ID when joining the MBS, and the MS joins the MBS by an IP multicast technology (IGMP Join), the MS obtains the corresponding MBS content ID from a DSA-REQ message initiated by the network side.

In this embodiment, an air interface link identified by one MCID contains, for example, a plurality of contents. If an air interface link identified by one MCID contains one content, the network side can directly send the content in the air interface link identified by the MCID, and the MS can directly receive a data in the air interface link identified by the MCID without obtaining the corresponding LCID from the MBS content ID of the required MBS based on the same correspondence as the network side.

In a second embodiment of the present invention, a method for transmitting an MBS is provided. This embodiment is substantially the same as the first embodiment. In the first embodiment, the MBS content ID is assigned by the MBS server of the network side. On the contrary, in this embodiment, the MBS content ID is assigned by the entity within the ASN or MBS zone such as ASN-GW/MBS proxy. The MBS content ID is still adapted to identify different IP flows sent by the MBS server. The ASN-GW/MBS proxy assigns different MBS content IDs according to different IP flows. The assigned MBS content IDs are unique within the ASN or the MBS zone, and are notified to the MS by a DSA process defined in the air interface standards.

Because the MBS content IDs of the MBS are assigned by the ASN entity in this embodiment, a process in which the MBS server informs the ASN about the assigned MBS content ID is omitted, thus reducing the signaling exchange.

In a third embodiment of the present invention, a method for transmitting an MBS is provided. This embodiment is substantially the same as the second embodiment. In the second embodiment, the ASN entity sets values of corresponding LCIDs according to value features of the MBS content IDs. In this embodiment, IDs assigned to IP flows are taken as the LCIDs, and values of corresponding MBS content IDs are set according to values of the LCIDs.

In particular, the MBS server assigns one ID to each IP flow, and the ID serves as an LCID within the ASN or MBS zone. An entity within the ASN or MBS zone such as an MBS proxy may assign different MBS content IDs according to different LCIDs on an MCID. In this case, the MBS content IDs are unique within the MBS zone. Because different LCIDs on the same MCID still correspond to different MBS content IDs, it can be ensured that the MS can successfully obtain an MBS data corresponding to an MBS content ID from an air interface.

In a fourth embodiment of the present invention, a method for transmitting an MBS is provided. This embodiment is substantially the same as the first embodiment. In the first embodiment, values of corresponding LCIDs need to be set according to value features of the MBS content IDs. In this embodiment, values of corresponding LCIDs need to be set according to values of the MBS content IDs, that is to say, the LCIDs may be derived from the values of the MBS content IDs.

In particular, as defined in the air interface standards, an MBS content ID has a length of two bytes, and an LCID has a length of one byte. When a plurality of contents is borne on the same MCID and it is assumed that the MBS content IDs assigned by the MBS server have identical high bytes and different low bytes, values of LCIDs may be set as the low bytes of the MBS content IDs, such that different contents on the same MCID respectively uniquely correspond to different LCIDs, so as to ensure that the MS can successfully obtain an MBS data corresponding to an MBS content ID from an air interface. Definitely, if the MBS content IDs assigned by the MBS server have identical low bytes and different high bytes, the values of the LCIDs are set as the high bytes of the MBS content IDs.

Because the MBS content IDs are assigned by the MBS server, that is to say, whether different contents are borne on the same air interface link connection or not is decided by the MBS server, for example, during an MBS service plan, the LCIDs are also generated and assigned by the MBS server in fact.

In a fifth embodiment of the present invention, a method for transmitting an MBS is provided. This embodiment is substantially the same as the fourth embodiment. In the fourth embodiment, the ASN entity assigns MCIDs, and values of the MCIDs are irrelevant to the MBS content IDs assigned by the MBS server. On the contrary, in this embodiment, values of the MCIDs are set according to values of the MBS content IDs assigned by the MBS server, i.e., the MCIDs are generated and assigned by the MBS server in fact.

In particular, as defined by the existing air interface standards, an MCID is formed by two bytes and has fixed high bytes of "0xFE". When the MBS content IDs assigned by the MBS server have identical high bytes and different low bytes, the most significant eight bits of the MBS content IDs may be taken as the least significant eight bits of the MCIDs, and the least significant eight bits of the MBS content IDs may still be taken as values of the LCIDs. If the MBS content IDs assigned by the MBS server have identical low bytes and different high bytes, the least significant eight bits of the MBS content IDs may be taken as the least significant eight bits of the MCIDs, and the most significant eight bits of the MBS content IDs may still be taken as values of the LCIDs.

Because the MCIDs are derived from the values of the MBS content IDs, the MCIDs are actually assigned by the MBS server, that is to say, whether different contents are borne on the same air interface link or not is still decided by the MBS server. Because only the MBS server knows which contents adopt the same MBS authorization key (MAK), and only the contents using the same MAK can be borne on the same air interface link, the manner of assigning MCIDs by the MBS server can facilitate the network side to generate an air interface service encryption key according to the MAK.

In a sixth embodiment of the present invention, a method for transmitting an MBS is provided. This embodiment is substantially the same as the above embodiments in terms of the assignment and use of MCIDs and MBS content IDs. The difference there-between lies in that, in this embodiment, an air interface link identified by an MCID only bears an MBS data indicated by one MBS content ID. In this embodiment, only an MCID and an MBS content ID are employed to indicate and transfer an MBS. The network side sends an MBS data indicated by the MBS content ID to a terminal via an air interface link identified by the MCID based on a correspondence between MCIDs and MBS content IDs. The terminal receives the MBS corresponding to the MBS content ID from the air interface link identified by the corresponding MCID based on the set correspondence between MCIDs and MBS content IDs.

In a seventh embodiment of the present invention, a method for transmitting an MBS is provided. This embodiment is substantially the same as the above embodiments in terms of the assignment and use of MCIDs. The difference there-between lies in that, in this embodiment, the MBS server is located within the ASN, and only an MCID is used to indicate and send an MBS. The network side sends an MBS data to a terminal via an air interface link identified by the MCID based on a correspondence between MCIDs and MBSs. The terminal receives the corresponding MBS from the air interface link identified by the corresponding MCID based on the set correspondence between MCIDs and MBSs.

As seen from the above embodiments, in the present invention, the correspondence between LCIDs and MBS content IDs may be set in any one of the following manners: setting values of corresponding LCIDs according to value features of the MBS content IDs; setting values of corresponding LCIDs according to values of the MBS content IDs; or taking IDs assigned to IP flows as the LCIDs, and setting values of corresponding MBS content IDs according to values of the LCIDs.

The MBS content IDs may be assigned either by the MBS server or the ASN entity. When the MBS content IDs are assigned by the ASN entity, a process in which the MBS server informs the ASN about the assigned MBS content IDs can be omitted, thereby reducing the signaling exchange.

The values of the MCIDs are set according to values of the MBS content IDs assigned by the MBS server, such that the MCIDs are still assigned by the MBS server in fact, and thus whether MBSs having different MBS content IDs can be borne on one air interface link or not is decided by the MBS server that knows about the MAK, so as to generate an air interface service encryption key according to the MAK.

The uniqueness of the MBS content IDs can be guaranteed within different ranges. For example, the MBS content IDs are guaranteed to be unique within the MBS server, such that the MBS content IDs are maintained consistent within all ASNs or MBS zones where the service is provided. When a terminal moves among different ASNs or MBS zones of the same service, the ASN or MBS zone in a target network gets to know whether an MBS to be received by the terminal is provided within the network or not through handing over an MBS content ID of the MBS and an MBS server ID (or IP address) in a context, so as to further determine whether to accept the handover or not, or it registers to the MBS server and establishes a corresponding bearer channel in advance when the network side can provide the MBS service but currently does not provide the MBS service.

If the MBS content IDs are unique within an operator that manages the MBS server, the ASN or MBS zone can recognize MBS content IDs of the same MBS from MBS servers of different network service providers according to IDs of the network service providers.

If the MBS content IDs are unique within an ASN or an MBS zone where the service is provided, the entity within the ASN or the entity within the MBS zone does not need to further distinguish the MBS content IDs of the MBS by using the MBS server IDs or IDs of the network service providers during internal processing. As for the MS, if the object of the MBS joined by the MS is a specific IP multicast group, the MS does not need to know the MBS content ID thereof when the MS is handed over across ASNs or MBS zones. Instead, the MS can achieve a re-joining effect simply by using the original multicast address, or successfully joins the IP multicast with an assistance of the network side.

The MCIDs may be assigned by different an entities according to different modes of the BS. When a BS is in a multi-BS mode and a single-BS mode at the same time, value intervals may be divided for the MCIDs assigned by the BS and that assigned by the MBS proxy, so as to ensure the uniqueness thereof within the required range.

The ASN or the MBS zone may obtain the MBS content IDs through a pre-configuration manner according to the MBS service plan, and may also receive the MBS content IDs of the MBS from the MBS server through signaling during a service announcement stage of the MBS. The former solution has a simply deployment and can reduce signaling exchange, which thus is applicable to the case that the network access provider and the network service provider belong to a unified operating entity. The latter solution is applicable to a deployment of a wireless MAN or WAN.

In an eighth embodiment of the present invention, a system for transmitting an MBS is provided, which includes a network side and at least one MS.

The network side includes a module adapted to set a correspondence between LCIDs and MBS content IDs, and a module adapted to send an MBS data via a logical channel identified by an LCID corresponding to an MBS content ID in an air interface link identified by an MCID based on a preset correspondence between LCIDs and MBS content IDs.

The MS includes a module adapted to obtain a corresponding LCID from an MBS content ID based on the same correspondence as that of the network side, and a module adapted to receive a data via a logical channel identified by the LCID in an air interface link identified by an MCID of the required MBS.

In the network side, the module adapted to set a correspondence between LCIDs and MBS content IDs sets the correspondence between LCIDs and MBS content IDs by one of the following manners.

(1) Values of corresponding LCIDs are set according to value features of the MBS content IDs. For example, LCIDs (0, 1, 2 . . . ) are sequentially assigned according to an ascending order of values of the MBS content IDs on the MCID. It should be understood that, the sequential assignment according to the ascending order is merely taken as an example, and the actual assignment algorithms are not limited here. It is merely intended to emphasize that the LCIDs are assigned after being processed by a certain algorithm according to an MBS content ID list. At this time, the LCIDs are maintained unique on the same MCID in the same MBS zone, and one MBS content ID uniquely corresponds to one LCID and one MCID in an MBS zone, so as to ensure that the MS can successfully obtain an MBS data corresponding to an MBS content ID from an air interface.

(2) Values of corresponding LCIDs are set according to values of the MBS content IDs. For example, values of the LCIDs are set as low bytes of the MBS content IDs, such that different MBS content IDs on the same MCID respectively correspond to different LCIDs, so as to ensure that the MS can successfully obtain an MBS data corresponding to an MBS content ID from an air interface.

(3) IDs assigned to IP flows are taken as the LCIDs, and values of the LCIDs are set as values of corresponding MBS content IDs. In this case, the MBS content IDs are unique within each MBS zone. Because different LCIDs on the same MCID still correspond to different contents, it can be ensured that the MS can successfully obtain an MBS data corresponding to an MBS content ID from an air interface.

The MBS content IDs may be assigned by an MBS server in the network side, and the MCIDs and the LCIDs may be assigned by an ASN entity in the network side. Alternatively, the MBS content IDs, MCIDs, and LCIDs are all assigned by an ASN entity in the network side, so as to avoid a process in which the MBS server informs the ASN about the assigned MBS content IDs, thereby reducing the signaling exchange.

It should be noted that, values of the MCIDs may also be set according to the values of the MBS content IDs. For example, the most significant eight bits of the MBS content IDs are taken as the least significant eight bits of the MCIDs, while the most significant eight bits of the MCIDs still adopt the fixed bytes "0xFE". Thus, in fact, the MCIDs are still assigned by an MBS server, and whether MBSs with different MBS content IDs can be borne in one air interface link or not is decided by the MBS server that knows an MBS authorization key (MAK), so as to generate an air interface service encryption key according to the MAK.

In a ninth embodiment of the present invention, a system for transmitting an MBS is provided, which includes a network side and at least one MS.

The network side includes a module adapted to set a correspondence between MCIDs and MBS content IDs, and a module adapted to send an MBS data corresponding to an MBS content ID in an air interface link identified by an MCID based on a preset correspondence between MCIDs and MBS content IDs.

The MS includes a module adapted to receive the MBS data corresponding to the MBS content ID from the air interface link identified by the MCID of the required MBS based on the same correspondence as that of the network side.

In a tenth embodiment of the present invention, a system for transmitting an MBS is provided, which includes a network side and at least one MS.

The network side includes a module adapted to set a correspondence between MCIDs and MBSs, and a module adapted to send a corresponding MBS data in an air interface link identified by an MCID based on a preset correspondence between MCIDs and MBSs.

The MS includes a module adapted to receive the corresponding MBS data from the air interface link identified by the MCID of the required MBS based on the same correspondence as that of the network side.

In an eleventh embodiment of the present invention, a terminal equipment is provided, which includes: a module adapted to obtain a corresponding LCID from an MBS content ID of a required MBS based on the same correspondence as that of a network side, and a module adapted to receive a data via a logical channel identified by the LCID in an air interface link identified by an MCID of the required MBS. As such, the terminal equipment can successfully obtain the required MBS data corresponding to the MBS content ID from an air interface in a WiMAX system.

In a twelfth embodiment of the present invention, a terminal equipment is provided, which includes a module adapted to obtain an MCID of an MBS, and a module adapted to receive a required MBS data in an air interface link identified by the MCID of the required MBS. As such, the terminal equipment can successfully obtain the required MBS data from an air interface in a WiMAX system.

In a thirteenth embodiment of the present invention, a terminal equipment is provided, which includes a module adapted to obtain an MBS content ID, a module adapted to obtain an MCID corresponding to the MBS content ID based on the same correspondence as that of a network side, and a module adapted to receive an MBS data corresponding to the MBS content ID in an air interface link identified by the MCID of the MBS. As such, the terminal equipment can successfully obtain the required MBS data from an air interface in a WiMAX system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for sending a multicast broadcast service (MBS), the method comprising:
   assigning a transmission identifier (ID) to an MBS, wherein the transmission ID comprises an MCID for identifying an air interface link, an MBS content ID for identifying a different MBS data flow, and a logical channel ID (LCID) for identifying a logical channel in the air interface link, and wherein one MBS content ID uniquely corresponds to one LCID and one MCID in an MBS zone; and
   sending MBS data via a logical channel identified by the LCID corresponding to an MBS content ID in an air interface link identified by an MCID based on a predetermined correspondence between the MBS content ID and the LCID.

2. The method according to claim 1, wherein the correspondence between LCIDs and MBS content IDs further comprises:
   setting values of corresponding LCIDs according to value features of the MBS content IDs; or
   setting values of corresponding LCIDs according to values of the MBS content IDs; or
   taking IDs assigned to MBS data flows as LCIDs, and setting values of corresponding MBS content IDs according to values of the LCIDs.

3. The method according to claim 1, wherein
   the MBS content IDs are assigned by an MBS server according to different MBS data flows; or
   the MBS content IDs are assigned by an entity within an access service network (ASN) or an entity within an MBS zone according to different MBS data flows or different LCIDs on an MCID.

4. The method according to claim 3, wherein
   the MBS content IDs are unique within the MBS server;
   the MBS content IDs are unique within an operator that manages the MBS server; or
   the MBS content IDs are unique within an ASN or an MBS zone where MBSs are provided.

5. The method according to claim 3, wherein the entity within the ASN or the entity within the MBS zone obtains the MBS content IDs according to configuration information.

6. The method according to claim 3, further comprising:
   delivering, by the MBS server, the entity within the ASN, and/or the entity within the MBS zone, the MBS content IDs, MCIDs, and/or LCIDs to a terminal.

7. The method according to claim 1, wherein
   the MCIDs are assigned by an MBS server according to different MBS data flows; or
   the MCIDs are assigned by an entity within an ASN and/or an entity within an MBS zone according to different MBS data flows or MBS content IDs.

8. The method according to claim 1, wherein
   the LCIDs are assigned by an MBS server according to different MBS data flows; or
   the LCIDs are assigned by an entity within an ASN and/or an entity within an MBS zone.

9. The method according to claim 8, wherein
   values of corresponding LCIDs are set according to value features of the MBS content IDs;
   values of corresponding LCIDs are set according to values of the MBS content IDs; or
   IDs assigned to MBS data flows by the MBS server are taken as LCIDs within the ASN or the MBS zone.

10. The method according to claim 3, further comprising:
    delivering, by the MBS server, the MBS content IDs, MCIDs, and/or LCIDs to the entity within the ASN and/or the entity within the MBS zone.

11. The method according to claim 3, wherein the entity within the ASN and/or the entity within the MBS zone comprise a base station (BS), an access network gateway, and/or an MBS proxy.

12. A method for receiving a multicast broadcast service (MBS), the method comprising:
    obtaining, by a terminal, a transmission identifier (ID) of an MBS, wherein the transmission ID comprises an MCID for identifying an air interface link, an MBS content ID for identifying a different MBS data flow, and a logical channel ID (LCID) for identifying a logical channel in the air interface link, and wherein one MBS content ID uniquely corresponds to one LCID and one MCID in an MBS zone; and
    receiving the MBS data via a logical channel identified by the LCID corresponding to an MBS content ID in an air interface link identified by an MCID based on a predetermined correspondence between the MBS content ID and the LCID.

13. The method according to claim 12, wherein the MCIDs, MBS content IDs, and/or LCIDs are obtained from an MBS server, an entity within an access service network (ASN), and/or an entity within an MBS zone.

14. The method according to claim 13, wherein the terminal joins the MBS by a dynamic service addition request (DSA-REQ) message; and wherein the obtaining, by the terminal, the MBS content ID of the required MBS further comprises:
    obtaining, by the terminal, the MBS content ID from the MBS server before initiating the DSA-REQ; or
    obtaining, by the terminal, the MBS content ID of the required MBS from a dynamic service addition response (DSA-RSP) message returned by the network side.

15. The method according to claim 13, wherein the terminal joins the MBS by an IP multicast technology, and the obtaining, by the terminal, the MBS content ID of the required MBS further comprises:
    obtaining, by the terminal, the MBS content ID of the required MBS by a DSA-REQ message initiated by the network side.

16. The method according to claim 13, wherein the entity within the ASN and/or the entity within the MBS zone comprise: an ASN gateway (ASN-GW), an ASN base station (BS), and/or an MBS proxy.

17. A system for sending a multicast broadcast service (MBS), the system comprising:
   an entity, adapted to assign a transmission identifier (ID) to an MBS, wherein the transmission ID further comprises a logical channel ID (LCID) for identifying a logical channel in the air interface link and one MBS content ID uniquely corresponds to one LCID and one MCID in an MBS zone; and
   a module, adapted to send an MDS data in a link corresponding to the transmission ID, wherein the module is adapted to send the MBS data via a logical channel identified by the LCID corresponding to the MBS content ID in an air interface link identified by the MCID based on a preset correspondence between the MBS content ID and the LCID.

18. The system according to claim 17, further comprising a module, adapted to set the correspondence between LCIDs and MBS content IDs, wherein the module sets the correspondence between LCIDs and MBS content IDs by one of the following manners:
   setting values of corresponding LCIDs according to value features of the MBS content IDs;
   setting values of corresponding LCIDs according to values of the MBS content IDs; or
   taking IDs assigned to IP flows as LCIDs, and setting values of corresponding MBS content IDs according to values of the LCIDs.

19. A terminal equipment, comprising:
   a module, adapted to obtain a transmission identifier (ID) to an MBS, wherein the transmission ID further comprises a logical channel ID (LCID) for identifying a logical channel in the air interface link, and wherein one MBS content ID uniquely corresponds to one LCID and one MCID in an MBS zone; and
   a module, adapted to receive an MBS data in a link corresponding to the transmission ID sends the MBS data via a logical channel identified by the LCID corresponding to the MBS content ID in an air interface link identified by the MCID based on a preset correspondence between the MBS content ID and the LCID.

* * * * *